FERDINAND PHILIPP, OF ROMANSHORN, ASSIGNOR TO JACQUES DE PLANTA, OF TAENIKON NEAR AADORF, SWITZERLAND.

LIQUID CEMENT FOR GIVING A CHEAP AND DURABLE METAL COATING TO PAPIER-MACHÉ, PLASTER-OF-PARIS, CLAY, &c.

SPECIFICATION forming part of Letters Patent No. 300,890, dated June 24, 1884.

Application filed March 12, 1884. (No specimens.)

*To all whom it may concern:*

Be it known that I, FERDINAND PHILIPP, of Romanshorn, in the Canton of Thurgau and Republic of Switzerland, have invented certain new and useful Improvements in Liquid Cement for Giving a Cheap and Durable Metal Coating to Papier-Maché, Plaster-of-Paris, Clay, Slate, Hardened Cement, Metal, &c.—as, for instance, to roof slates, tiles, &c.—by which the roof receives a metallic appearance and becomes water-proof; and I do hereby declare that the following is a full, clear, and exact description of the invention, which will enable others skilled in the art to which it appertains to make and use the same.

My new composition is prepared by two combined processes which complete one another. The first consists of the following ingredients, which are mixed in substantially the following proportions, viz: No. 1, sixty parts powdered colophony; fifteen parts alcohol, spirit of wine, or pyroxylic spirit, ten parts turpentine, ten parts petroleum spirit, five parts silicate of soda—total, one hundred parts. The liquid thus prepared is then spread upon the object to be treated after the manner of applying a sizing, and is applicable to papier-maché, plaster-of-paris, clay, slate, cement, metals, &c., and renders them more firm and water-proof. When it is desired to give a metallic finish in imitation of metal to the object treated with the above composition, I apply to its surface, before the composition has hardened, a dust of any desired metal—*e. g.*, silver or copper, &c.—by means of a fine camel's-hair brush, after which the metalized object is dried in warm air or in the sun. In order that not only the metal dust may adhere, but that also the metallic color may be retained and not oxidize on exposure to the air, the second composition or varnish is laid quite lightly on the metallized surface after the lapse of a few days. To prepare this composition No. 2, I dissolve, first of all, one part of bichromate of potash in five parts of water, and mix then, say, eighty parts of distilled water, fifteen parts of Russian glue, five parts of the above solution, or five parts of chromate of alum and water (1.5)—total, one hundred parts. After the object thus treated has been dried for some days in warm air or in the sun it will be found that this layer or metallic surface will become so hard and firm that it will not be injured by exposure to the heat of the sun or to frost or moisture—being, in fact, weather-proof.

Heretofore, so far as I am aware, permanent metal surfaces have been imparted to many articles—such as stone, tiles, terra-cotta, and earthenware—by burning them in or by other costly processes; but by my mode of treatment I avoid all this labor, expense, and delay, and also any detriment to or destruction of the metallic colors, as the heat required to impart them is not of an intense character.

Porous and water-absorbing materials are rendered impervious by coating with my improved liquid-cement recipe No. 1, and it is therefore especially desirable for damp walls, roofs, roofing, and for cornices, &c.

To be more explicit, the entire metallizing methods herein described may be said to consist, first, of a coating of the composition first herein above described laid on the object to be treated; then in the spreading of a metal dust upon it (when it is desired to give a metallic finish to imitate metal) before the liquid is quite dry; and, lastly, in the laying on of my composition or varnish above described and designated as No. 2, for the protection of the color of the metal dust applied, as above set forth, to the surface of the object.

What I claim, and desire to secure by Letters Patent, is—

1. The herein-described compound for treating materials to render them firm and water-proof, consisting of colophony, alcohol, (spirit of wine or pyroxylic spirit,) turpentine, petroleum spirit, and silicate of soda, in the proportions substantially as set forth.

2. The herein-described compound for protecting the metallic color of bodies surfaced with metallic dust, consisting of bicromate of potash, distilled water, and Russian glue, in the proportions substantially as set forth.

3. The described method of metallizing the surface of bodies, consisting in first coating with the composition designated above as No. 1; then spreading metal dust upon it before the liquid is quite dry; and, lastly, laying upon such metal-dusted surface a light coating or varnish composed of the materials designated above as No. 2.

FERD. PHILIPP.

Witnesses:
ERNEST TREI,
CARL MÜLLER,
*Both of Romanshorn.*